United States Patent
Gean et al.

(10) Patent No.: US 10,595,129 B1
(45) Date of Patent: Mar. 17, 2020

(54) METHODS AND APPARATUS FOR CONFIGURING MULTIPLE MICROPHONES IN AN ELECTRONIC COMMUNICATION DEVICE

(71) Applicant: Motorola Solutions, Inc., Chicago, IL (US)

(72) Inventors: Nissim Gean, Netanya (IL); Haim Kahlon, Shoam (IL); Adam Gilboa, Maayan-Tzvi (IL); Hadi Shvartz, Bat Hadar (IL)

(73) Assignee: Motorola Solutions, Inc., Chicago, IL (US)

( * ) Notice: Subject to any disclaimer, the term of this patent is extended or adjusted under 35 U.S.C. 154(b) by 0 days.

(21) Appl. No.: 16/232,629

(22) Filed: Dec. 26, 2018

(51) Int. Cl.
*H04R 5/04* (2006.01)
*H04R 5/027* (2006.01)
*H04R 3/00* (2006.01)
*G06T 7/70* (2017.01)

(52) U.S. Cl.
CPC ............. *H04R 5/04* (2013.01); *G06T 7/70* (2017.01); *H04R 3/005* (2013.01); *H04R 5/027* (2013.01); *H04R 2499/11* (2013.01)

(58) Field of Classification Search
CPC .......... H04R 5/04; H04R 5/027; H04R 3/005; H04R 2499/11; G06T 7/70
See application file for complete search history.

(56) References Cited

U.S. PATENT DOCUMENTS

| | | | |
|---|---|---|---|
| 7,580,725 B2 | 8/2009 | Delker et al. | |
| 8,736,564 B2 * | 5/2014 | Tong | G06F 3/044 345/173 |
| 8,908,880 B2 * | 12/2014 | Zurek | H04R 1/406 381/333 |
| 8,996,767 B2 * | 3/2015 | Eaton | H04M 1/72569 710/72 |
| 9,426,567 B2 * | 8/2016 | Lee | H04M 1/6008 |
| 9,668,048 B2 * | 5/2017 | Sakri | H04M 9/08 |
| 9,674,625 B2 * | 6/2017 | Armstrong-Muntner | G01S 15/003 |
| 9,888,317 B2 * | 2/2018 | Sassi | H04R 3/002 |
| 2012/0299864 A1 | 11/2012 | Tong et al. | |
| 2013/0272539 A1 * | 10/2013 | Kim | G01S 3/8006 381/92 |
| 2014/0064506 A1 * | 3/2014 | Ryu | H04M 1/6016 381/66 |

* cited by examiner

*Primary Examiner* — Oyesola C Ojo
(74) *Attorney, Agent, or Firm* — Baker Botts L.L.P.

(57) ABSTRACT

Methods and apparatus for configuring an electronic communication device are disclosed. The methods include determining that the device is operating in a loud speaker mode and a front side of the device is in proximity to a surface, thus determining that the device is in a position associated with acoustic coupling between the loud speaker and the front microphone. The methods include initiating emission of a beacon signal from the loud speaker, determining, dependent on a measured property of the beacon signal received by the front microphone, that the acoustic coupling exceeds a predetermined threshold for high acoustic coupling and, in response, configuring a rear microphone as the primary microphone for capturing audio input. The beacon signal may be an ultrasonic signal. Once the device is no longer in the position associated with acoustic coupling nor experiencing high acoustic coupling, the front microphone may be configured as the primary microphone.

20 Claims, 8 Drawing Sheets

METHODS AND APPARATUS FOR CONFIGURING MULTIPLE MICROPHONES IN AN ELECTRONIC COMMUNICATION DEVICE

BACKGROUND OF THE INVENTION

Feature rich portable electronic devices, including portable communication devices, have evolved from simple analog devices to multifunction computing systems with different software-controlled modes. Some advanced radios include multiple microphones for high quality performance. Typically, when these radios operate in a loud speaker mode, a front-facing microphone is configured as the primary microphone for capturing audio input during a communication and a rear-facing microphone, if present, is configured as a secondary microphone. For example, the sound captured by the secondary microphone is sometimes used as an environmental reference for noise cancellation purposes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1B:
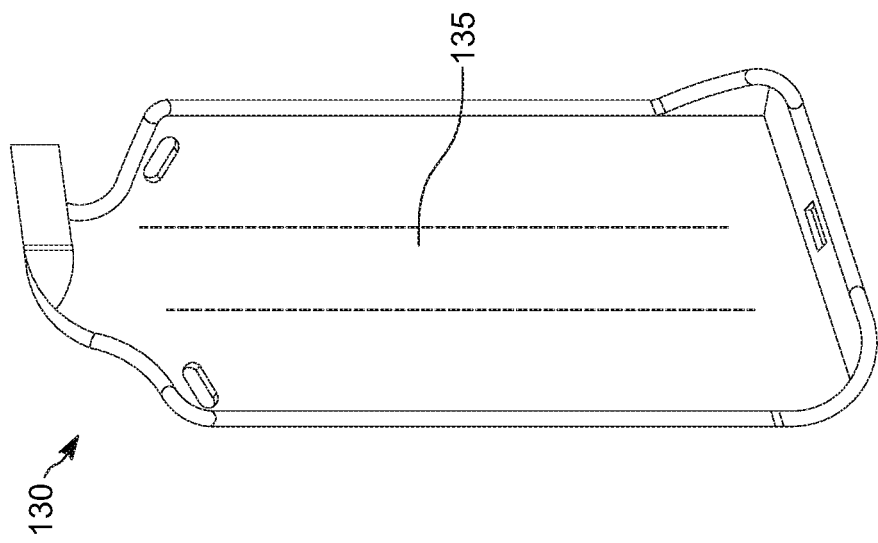
FIG. 1B is an illustration of an example holster for an electronic communication device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods, apparatus, and non-transitory, computer-readable storage media for configuring multiple microphones in an electronic communication device based on device position and acoustic coupling. In one embodiment, a disclosed electronic communication device includes a front microphone disposed on a front side of the device, a rear microphone disposed on a rear side of the device opposite and substantially parallel to the front side of the device, a loud speaker disposed on the front side of the device, a proximity sensing circuit configured to determine that the front side of the device is in proximity to a surface, a beacon generation circuit configured to generate a beacon signal output from the front side of the device, a beacon measurement circuit disposed on the front side of the device, and a processing unit. The beacon measurement circuit is configured to receive the beacon signal and generate an indication of a strength of the received beacon signal. The processing unit includes circuitry to determine, while the front microphone is configured as a primary microphone for capturing audio input for a communication in progress, that the device is operating in a loud speaker mode in which the loud speaker is configured for audio output, to determine, dependent on the determination that the device is operating in the loud speaker mode and the determination that the front side of the device is in proximity to the surface, that the device is in a position associated with acoustic coupling between the loud speaker and the front microphone, to initiate, dependent on the determination that the device is in a position associated with acoustic coupling between the loud speaker and the front microphone, emission of the beacon signal by the beacon generation circuit, to determine, dependent on the indication of the strength of the received beacon signal, that the acoustic coupling exceeds a predetermined threshold for acoustic coupling, and to configure the rear microphone as the primary microphone for capturing audio input for the communication in progress in response to the determination that the acoustic coupling exceeds the predetermined threshold.

In one embodiment, a disclosed method configuring multiple microphones in an electronic communication device includes determining, while a front microphone of the device is configured as a primary microphone for capturing audio input for a communication in progress, that the device is operating in a loud speaker mode in which a loud speaker of the device is configured for audio output, determining that the front side of the device is in proximity to a surface, determining, dependent on the determination that the device is operating in the loud speaker mode and the determination that the front side of the device is in proximity to the surface, that the device is in a position associated with acoustic coupling between the loud speaker and the front microphone, initiating, dependent on the determination that the device is in a position associated with acoustic coupling between the loud speaker and the front microphone, emission of a beacon signal by a loud speaker of the device, determining, dependent on an indication of a strength of the beacon signal as received by the front microphone, that the acoustic coupling between the loud speaker and the front microphone exceeds a predetermined threshold for acoustic coupling, and configuring a rear microphone of the device as the primary microphone for capturing audio input for the communication in progress in response to the determination that the acoustic coupling between the loud speaker and the front microphone exceeds the predetermined threshold.

In one embodiment, a disclosed non-transitory, computer-readable storage medium has program instructions stored thereon that when executed by an electronic processor cause the electronic processor to perform determining, while a front microphone of an electronic communication device is configured as a primary microphone for capturing audio input for a communication in progress, that the device is operating in a loud speaker mode in which a loud speaker of the device is configured for audio output, determining that the front side of the device is in proximity to a surface, determining, dependent on the determination that the device is operating in the loud speaker mode and the determination that the front side of the device is in proximity to the surface, that the device is in a position associated with acoustic coupling between the loud speaker and the front microphone, initiating, dependent on the determination that the device is in a position associated with acoustic coupling between the loud speaker and the front microphone, emission of a beacon signal by a loud speaker of the device, determining, dependent on an indication of a strength of the beacon signal as received by the front microphone, that the acoustic coupling between the loud speaker and the front microphone exceeds a predetermined threshold for acoustic coupling, and configuring a rear microphone of the device as the primary microphone for capturing audio input for the communication in progress in response to the determination that the acoustic coupling between the loud speaker and the front microphone exceeds the predetermined threshold In at least some embodiments of the present disclosure, if, or once, the electronic communication device is not in a position associated with acoustic coupling between the loud speaker and the front microphone, the front microphone may be configured as the primary microphone for the communication in progress. Similarly, if, or once, the acoustic coupling between the loud speaker and the front microphone does not exceed the predetermined threshold for acoustic coupling, the front microphone may be configured as the primary microphone for the communication in progress.

Figure 1A:
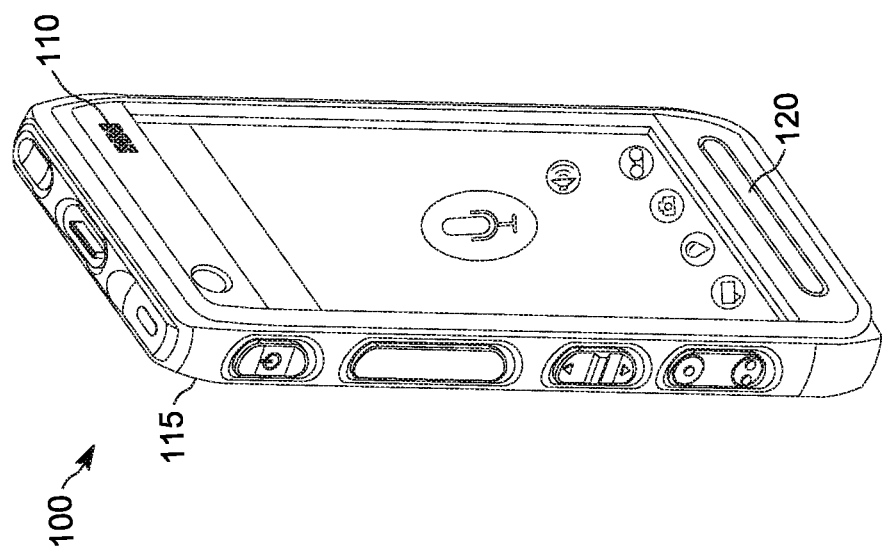
FIG. 1A is an illustration of an example electronic communication device, in accordance with some embodiments.

Referring now to FIG. 1A, there is provided an illustration of one embodiment of an example electronic communication device 100. In the illustrated example, device 100 includes, among other elements, a top front microphone 110, a top rear microphone 115, and a loud speaker 120 disposed on the front side of the device. As described in more detail below, each of the microphones 110 and 115 may be configured as primary or secondary microphones for a communication in progress dependent on the position of device 100 and on the amount of acoustic coupling, if any, between loud speaker 120 and top front microphone 110.

In some embodiments, an electronic communication device such as device 100 may be used in conjunction with a holster that allows a user, whether a public safety officer or a private citizen, to wear and operate the device in a hands-free manner. In some embodiments, the device may be placed in the holster in one of two positions, either front-facing or rear-facing. In one example, a holster for an electronic communication device 100 that includes both a front-facing microphone, such as top front microphone 110, and a rear-facing microphone, such as top rear microphone 115, may include an audio tunneling feature configured to boost the volume of the audio received during a communication to the user.

Referring now to FIG. 1B, there is provided an illustration of an example holster 130 for an electronic communication device, in accordance with some embodiments. In the illustrated example, the holster includes an audio cavity, shown as tunnel 135, running vertically through the middle of holster 130 that directs sound from a loud speaker near the bottom of the device, such as loud speaker 120 of electronic communication device 100, toward the top of the device. For example, tunnel 135 may be implemented as an indention running up the middle of holster 130 to direct sound upward so that it is aimed toward the ear of a public safety officer wearing the device 100 in a holster positioned on their chest. In at least some embodiments, tunnel 135 may improve the clarity and increase the volume of the audio.

In the illustrated example, holster 130 is designed for two in-holster modes: a front-facing mode in which the loud speaker and a display of an electronic communication device (not identified in FIG. 1B) are facing out (i.e., away from holster 130) and a camera is facing in (i.e., toward holster 130), and a rear-facing mode in which the loud speaker (e.g., such as loud speaker 120) and display of the device are facing in and the camera is facing out. When an electronic communication device is in the rear-facing mode in holster 130, the display of the device, such as a liquid crystal display (LCD), may be protected from damage due to the position of the device within holster 130. However, when the device is in the rear-facing position, the primary microphone (e.g., such as top front microphone 110) and the loud speaker are highly coupled by holster 130, such that any speech or tone emitted from the loud speaker will be significantly be magnified and fed back to the front microphone in a way that a standard echo cancellation cannot handle effectively. In such embodiments, the acoustic coupling between the loud speaker and the front microphone may be exacerbated due to the presence of the tunnel 135. Under these conditions, the device 100 may be unsuitable for making full duplex calls. Typically, when an electronic communication device is in the rear-facing mode in holster 130, the primary microphone is partially blocked by holster 130, and the human body, which may impact the speech quality. Note that similar issues are experienced when an electronic communication device is placed on a surface in a rear-facing position, such as when the LCD is face down.

In some embodiments, an electronic communication device such as device 100 may be used in conjunction with a cradle that allows a user, whether a public safety officer or a private citizen, to mount the device in a vehicle or elsewhere for hands-free operation. In some embodiments, the cradle may be installed in a fixed position within the vehicle and the device may be placed in the cradle in one of two positions, either front-facing or rear-facing, in the same or a similar manner to that set forth above with respect to holster 130.

Figure 1C:
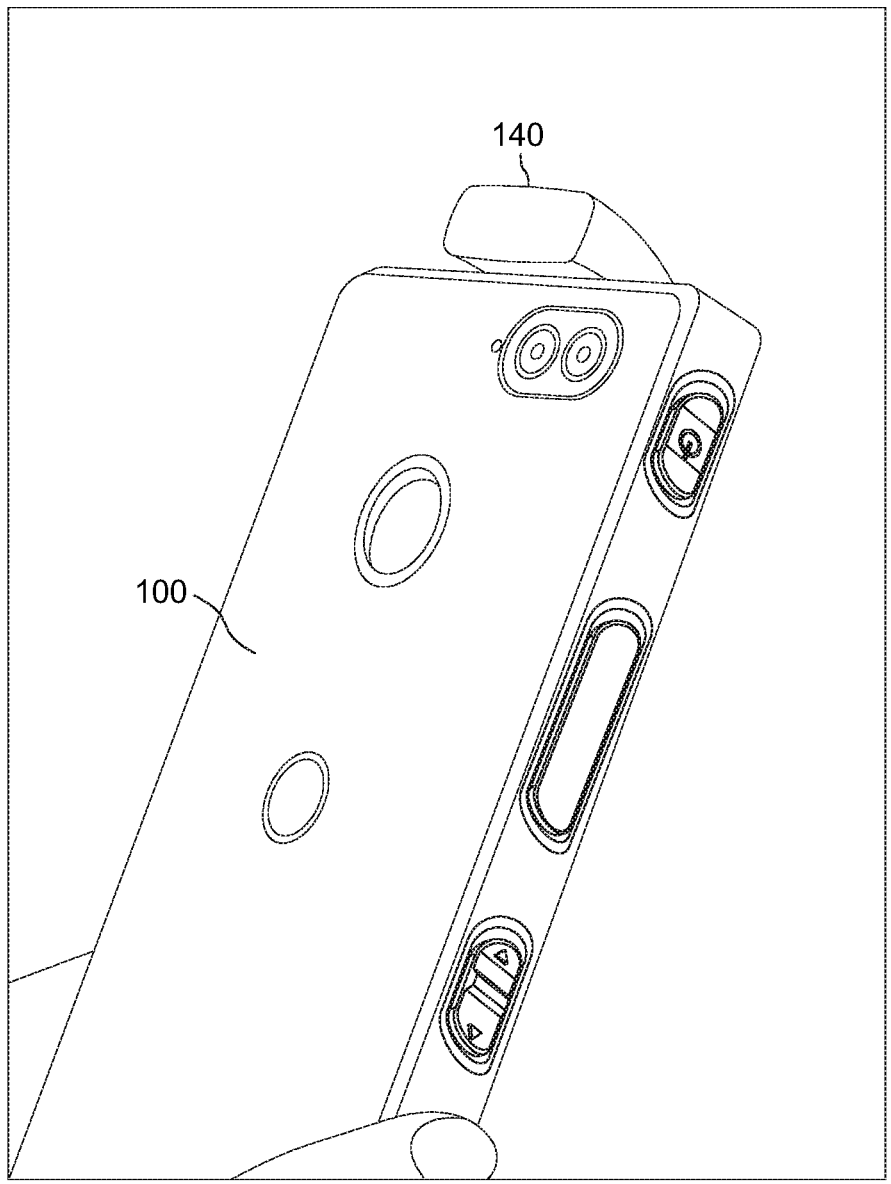
FIG. 1C is an illustration of an example electronic communication device mounted in a vehicle-installed cradle, in accordance with some embodiments.

Referring now to FIG. 1C, there is provided an illustration of an example electronic communication device 100 mounted in a vehicle-installed cradle 140, in accordance with some embodiments. In the illustrated example, device 100 is shown in a rear-facing position, with the LCD face down in cradle 140. While device 100 is in this position, it may experience high acoustic coupling whether or not cradle 140 includes an audio tunneling feature that is the same as or similar to tunnel 135 illustrated in FIG. 1B.

In at least some embodiments, the electronic communication devices described herein may be configured to detect high acoustic coupling states and, upon detection, to change the audio routing to mitigate the acoustic coupling and improve audio quality. For example, upon detection of a high acoustic coupling state, the audio routing within the device may be modified to configure the rear-facing microphone, such as top rear microphone 115, as the primary microphone for capturing audio inputs for a communication, thus resolving the high acoustic coupling condition and the echoing issue described above. The techniques described herein for configuring multiple microphones in an electronic communication device based on device position and acoustic coupling may be applied to electronic communication devices placed in any front-facing or rear-facing positions including, but not limited to, in a holster, in a cradle, or on or substantially adjacent to (e.g., within 10 mm, or within 5 mm, or within 2 mm, or directly touching) a surface, in different embodiments.

Figure 2:
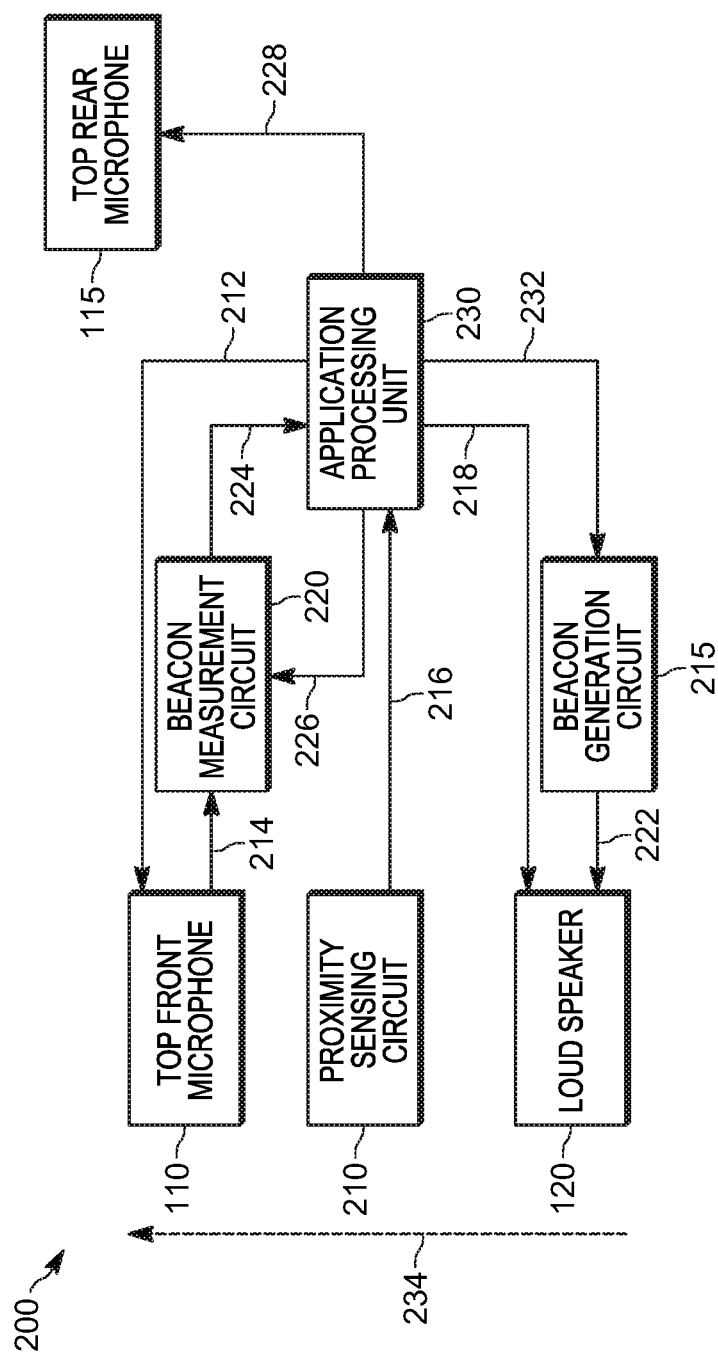
FIG. 2 is a block diagram illustrating selected elements of an example electronic communication device, in accordance with some embodiments.

Referring now to FIG. 2, there is provided a block diagram illustrating selected elements of an example electronic communication device 200, in accordance with some embodiments. In the illustrated example, device 200 includes a top front microphone 110 disposed on a front side of the device, a top rear microphone 115 disposed on a rear side of the device opposite and substantially parallel to the front side of the device, a proximity sensing circuit 210 configured to determine that the front side of the device is in proximity to a surface, a loud speaker 120 disposed on the front side of the device, a beacon generation circuit 215 configured to generate a short beacon signal output from the loud speaker 120 at the front side of the device, a beacon measurement circuit 220 coupled to the top front microphone 110 disposed on the front side of the device, and an application processing unit 230. The beacon measurement circuit 220 is configured to receive the beacon signal 214 and to generate an indication of a measured parameter of the received beacon signal, such as an indication of a strength of the received beacon signal or of a reverberation time of the received beacon signal, either of which may be indicative of the amount of acoustic coupling between the loud speaker and the top front microphone. In some embodiments, the top front microphone may always be enabled. However, at different times, it may function as a primary microphone for capturing audio input during a communication or as a secondary microphone used to capture sound as an environmental reference for noise cancellation purposes, for example. In some embodiments, only the microphone configured as a primary microphone for capturing audio input during a communication is enabled and any other microphones of the device primary microphone for capturing audio input during a communication are disabled.

In some embodiments, to determine that the front side of device 200 is in proximity to the surface, the proximity sensing circuit 210 is configured to detect that at least a portion of a sensor element of the proximity sending circuit is covered or otherwise blocked. In some embodiments, to determine that the front side of device 200 is in proximity to the surface, the proximity sensing circuit 210 is configured to determine that a distance between the device and the surface is less than a predetermined threshold distance such as one of those set forth above to determine substantial adjacency. In some embodiments, to determine that the front side of device 200 is in proximity to the surface, the proximity sensing circuit 210 is configured to detect that the device is disposed in a rear-facing position in a holster for the device. In some embodiments, to determine that the front side of device 200 is in proximity to the surface, the proximity sensing circuit 210 is configured to detect that the device is placed on the surface in a position in which the front side of the device is face-down on the surface. In some embodiments, the proximity sensing circuit 210 includes a camera. In some embodiments, the proximity sensing circuit 210 includes an infrared sensor or another light-based sensor.

The application processing unit 230 is configured to determine, based on inputs received from other elements of device 200, whether or not there is high acoustic coupling between loud speaker 120 and top front microphone 110 and to configure the microphones 110 and 115 accordingly. For example, application processing unit 230 is configured to determine, while top front microphone 110 is configured as a primary microphone for capturing audio input for a communication in progress, that device 200 is operating in a loud speaker mode in which the loud speaker 120 is configured for audio output, to determine, dependent on the determination that the device is operating in the loud speaker mode and the determination that the front side of the device is in proximity to the surface, that the device is in a position associated with acoustic coupling between the loud speaker 120 and the top front microphone 110, and to initiate, dependent on the determination that the device is in a position associated with acoustic coupling between the loud speaker and the front microphone, emission of the beacon signal by the beacon generation circuit 215. In some embodiments, the beacon signal may be an ultrasonic signal. The beacon signal may be output through the loud speaker 120.

In at least some embodiments, application processing unit 230 is also configured to determine, dependent on the indication of the measured parameter of the received beacon signal, such as the strength of the received beacon signal or the reverberation time of the received beacon signal, that the acoustic coupling exceeds a predetermined threshold for acoustic coupling, and to configure top rear microphone 115 as the primary microphone for capturing audio input for the communication in progress in response to the determination that the acoustic coupling exceeds the predetermined threshold. Application processing unit 230 may also be configured to configure the top front microphone 110 as the primary microphone when the device 200 is not in a position associated with acoustic coupling between the loud speaker 120 and top front microphone 110 or when any acoustic coupling between the loud speaker 120 and top front microphone 110 does not exceed the predetermined threshold.

In the illustrated example, subsequent to configuring the top rear microphone 115 as the primary microphone for capturing audio input, application processing unit 230 is configured to configure the front microphone as the primary microphone in response to determining that the device is no longer in a position associated with high acoustic coupling or that any acoustic coupling between the loud speaker 120 and top front microphone 110 no longer exceeds the predetermined threshold. For example, program instructions executing on application processing unit 230 may cause short beacon signals to be emitted periodically and used to determine whether the position of the device 200 or the degree of acoustic coupling has changed and to respond accordingly. In some embodiments, upon initiation of a new communication, such as when a call is made or received using electronic communication device 200, the default configuration may be that the top front microphone 110 serves as the primary microphone for the communication until and unless it is determined that the device is experiencing high acoustic coupling.

In the illustrated example, signals and data exchanged between elements of device 200 during operation include a control signal 218 to enable the loud speaker mode at loud speaker 120, a control signal 212 to enable the top front microphone 110 as the primary microphone for a communication in progress or upon initiation of a new communication, and an indication 216 that proximity sensing circuit 210 has detected a condition in which the front side of device 200 is in proximity to a surface. In some embodiments, the proximity sensing circuit 210 may be configured to output an interrupt signal 216 to indicate that the front side of device 200 is in proximity to the surface. In at least some embodiments, the application processing unit 230 may include circuitry to receive the proximity indication or interrupt signal 216 from the proximity sensing circuit 210 and to initiate the emission of the beacon signal by the beacon generation circuit 215 in response to receipt of the proximity indication or interrupt signal 216. For example, the application processing unit 230 may assert a control signal 226 to enable beacon measurement circuit 220 for measuring the strength, the reverberation time, or another parameter of the beacon signal as received at top front microphone 110 and may assert a control signal 232 to enable beacon generation circuit 215 to begin generating short, periodic, semi-periodic, or non-periodic beacon signals. In some embodiments, the proximity indication may be stored as a variable value or flag in local memory within the proximity sensing circuit 210 and the application processing unit 230 may poll the memory location to determine when and whether the front side of device 200 is in proximity to a surface.

The beacon signals generated by beacon generation circuit 215, shown as signals 222, may be routed to loud speaker 120 for output by loud speaker 120 as beacon signals 234. Beacon signals 234 may be received at top front microphone 110 and the received signals may be routed to beacon measurement circuit 220 as beacon signals 214 to determine a measured parameter of the received beacon signals indicative of acoustic coupling. For example, an indication of the strength or reverberation time of the beacon signals received at top front microphone 110 as measured by beacon measurement circuit 220 may be routed to application processing unit 230 as strength indication 224. Depending on the strength indication 224, application processing unit 230 may determine which of the two microphones (110, 115) should be configured as the primary microphone and which should be configured as the secondary microphone. For example, if strength indication 224 indicates that the acoustic coupling between loud speaker 120 and top front microphone 110 exceeds a predetermined threshold for acoustic coupling, application processing unit 230 may configure top rear microphone 115 as the primary microphone for the communication and top front microphone 110 as the secondary microphone. In this case, application processing unit 230 may assert a control signal 228 to configure top rear microphone 115 as the primary microphone and may de-assert control signal 212 to configure top front microphone 110 as the secondary microphone. However, if strength indication 224 indicates that the acoustic coupling between loud speaker 120 and top front microphone 110 does not exceed a predetermined threshold for acoustic coupling, application processing unit 230 may configure top front microphone 110 as the primary microphone for the communication and top rear microphone 115 as the secondary microphone. In this case, application processing unit 230 may continue to assert control signal 212 to configure top front microphone 110 as the primary microphone and may continue to de-assert control signal 228 to configure top rear microphone 115 as the secondary microphone.

In embodiments in which the beacon signal is an ultrasonic signal, beacon generation circuit 215 may be configured to generate an ultrasonic signal and beacon measurement circuit 220 may be configured to capture an ultrasonic level measurement.

Figure 3A:
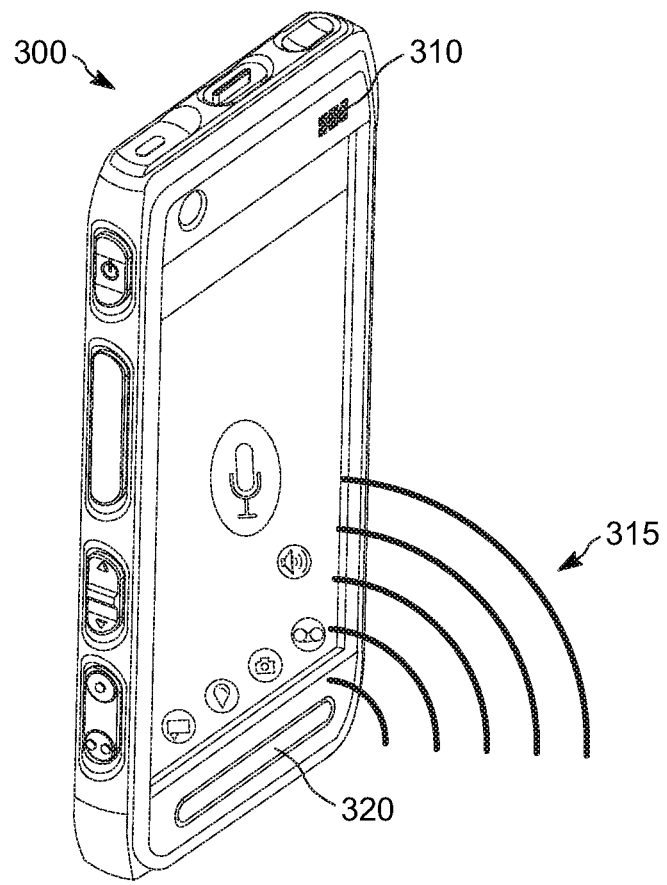
FIG. 3A is an illustration of an example electronic communication device that includes a beacon generator and a beacon measurement circuit, in accordance with some embodiments.

Referring now to FIG. 3A, there is provided an illustration of an example electronic communication device 300 that includes a beacon generation circuit 320 and a beacon measurement circuit 310, in accordance with some embodiments. In the illustrated example, beacon generation circuit 320 is configured to generate an ultrasonic beacon, shown as ultrasonic wave 315 to be output through a loud speaker or another output mechanism on a front side of device 300. Beacon measurement circuit 310 is configured to receive the ultrasonic wave 315 through a top front microphone or another input mechanism on the front side of the device and to measure the level of the received signal.

Figure 3B:
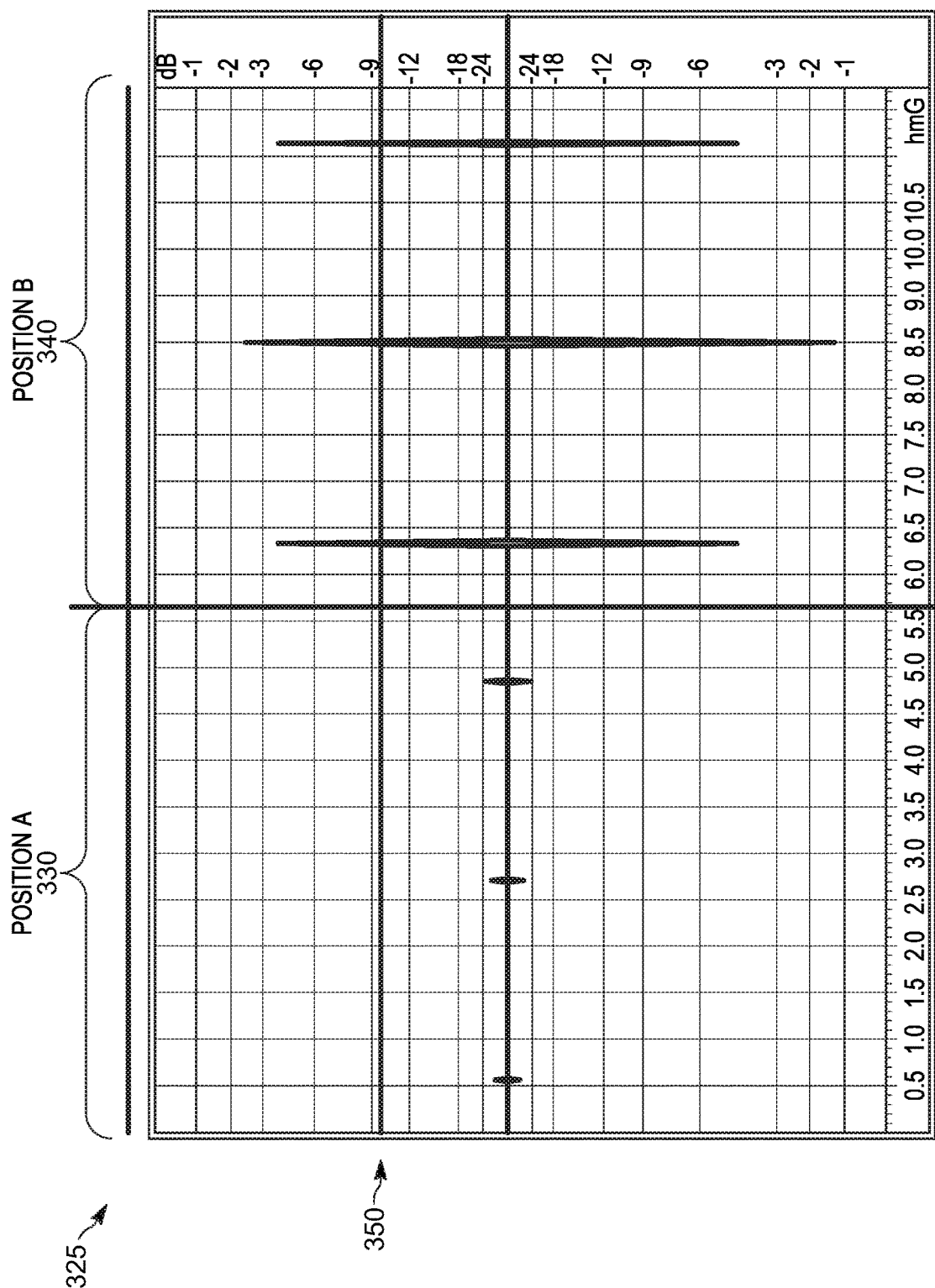
FIG. 3B depicts a chart illustrating measurements of acoustic coupling associated with different positions of an electronic communication device, in accordance with some embodiments.

Referring now to FIG. 3B, there is provided an example chart 325 illustrating measurements of acoustic coupling associated with different positions of an electronic communication device, in accordance with some embodiments. More specifically, chart 325 illustrates the difference in acoustic coupling when an electronic communication device is in a first position, referred to as position A, and a second position, referred to as position B. Position A may represent a position that is not typically associated with acoustic coupling between the loud speaker and the top front microphone of the device, such as a position in which the device is in a front-facing position in a holster or cradle, is not mounted in a holster or cradle, or is disposed face up on a surface. Position B may represent a position that is, at least in some cases, associated with acoustic coupling between the loud speaker and the top front microphone of the device, such as a position in which the device is in a rear-facing position in a holster or cradle, the front side of the device is held up against a human body, or the device is disposed face down on a surface.

To generate the data depicted in chart 325, ultrasonic beacons were generated from a loud speaker of an electronic communication device, such as device 300 illustrated in FIG. 3A, and the beacon signals as received by the top-front microphone were measured. Measurements were taken while device 300 was disposed in each of the two positions A and B. The amount of acoustic coupling is represented in chart 325 as a measurement of the strength of the ultrasonic beacon signal generated by a beacon generation circuit, such as beacon generation circuit 215 illustrated in FIG. 2, as measured by a beacon measurement circuit, such as beacon measurement circuit 220 illustrated in FIG. 2. As shown in chart 325, when the electronic communication device was in position A, shown by the measurements on the left half of the chart at 330, there was little to no acoustic coupling between the loud speaker and the top front microphone of the device. However, when the electronic communication device was in position B, shown by the measurements on the right half of the chart at 340, there was significant acoustic coupling between the loud speaker and the top front microphone of the device. This difference can be discerned by an application processing unit of the device to determine whether there is high acoustic coupling between the loud speaker and the top front microphone of the device. In this example, the captured data shows that the measured level of the ultrasonic beacon signal when the device was in position B was approximately 20 dB higher than when the device was in position A.

In this example, when the electronic communication device is in position B, the acoustic coupling exceeds a predetermined threshold for acoustic coupling, labeled as 350, indicating high acoustic coupling between the loud speaker and the top front microphone of the device. In one example, the predetermined threshold for acoustic coupling may be approximately −10 dB as illustrated in FIG. 3B. In other embodiments, the predetermined threshold may be in a range from −18 dB to −1 dB, or −12 dB to −6 dB, among other possibilities. In response to this condition, the application processing unit of the device may configure the top rear microphone as the primary microphone for the communication in progress and may configure the top front microphone as the secondary microphone for the communication in progress.

In some embodiments, the predetermined threshold for acoustic coupling above which an electronic communication device is considered to be experiencing high acoustic coupling may be a default value selected for a given electronic communication device or device type. For example, the predetermined threshold may be determined through a simulation during the design of the device. In some embodiments, the predetermined threshold for acoustic coupling above which an electronic communication device is considered to be experiencing high acoustic coupling may be determined through a calibration exercise similar to the exercise shown in FIG. 3B above. For example, measurements may be taken while a device is in each of the two positions described above and plotted on a graph. A threshold value such as in the ranges set forth above may be selected at a point that is easily discernable as reflecting the differences in the measurements between the two positions in the resulting graph. This threshold value may be programmed into the circuitry of the beacon measurement circuit or into program instructions to be executed by a processor within the application processing unit to enforce the threshold. Such a calibration may be performed once per device or device type at the factory in which they are manufactured or assembled, in some embodiments. In some embodiments, such a calibration may be performed by a user of the electronic communication device at any time by, for example, holding the device in each of the two positions in turn while selecting a calibration function using a mechanical user input mechanism or through a graphical user interface.

Figure 4:
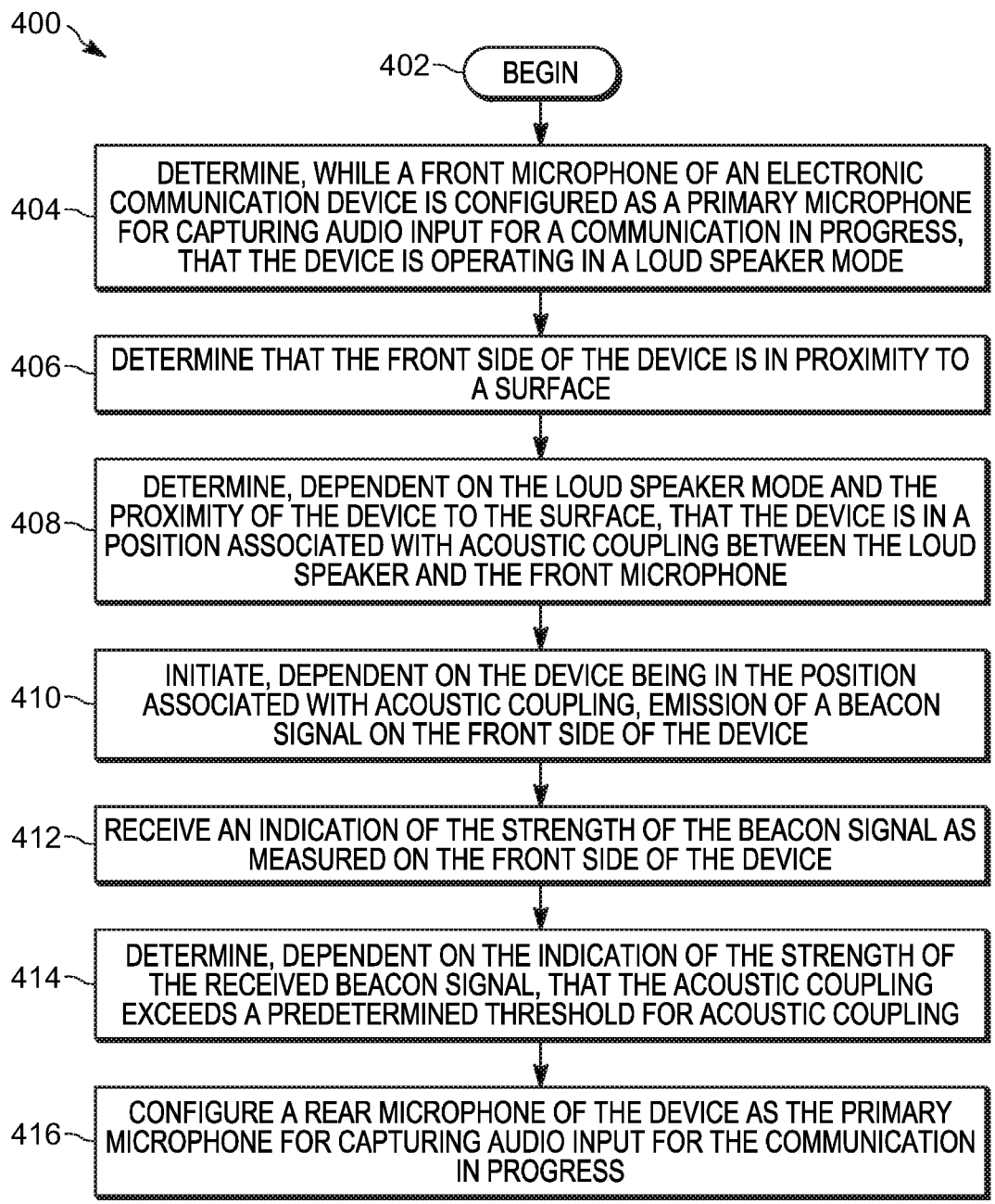
FIG. 4 is a flowchart illustrating selected elements of an example method for configuring multiple microphones in an electronic communication device based on device position and acoustic coupling, in accordance with some embodiments.

Referring now to FIG. 4, there is provided a flowchart illustrating selected elements of an example method 400 for configuring multiple microphones in an electronic communication device based on device position and acoustic coupling, in accordance with some embodiments. While a particular order of operations is indicated in FIG. 4 for illustrative purposes, the timing and ordering of such operations may vary where appropriate without negating the purpose and advantages of the examples set forth in detail throughout the remainder of this disclosure.

In this example embodiment, method 400 begins with block 402 in FIG. 4 and continues with block 404, where a determination is made, while a front microphone of an electronic communication device is configured as a primary microphone for capturing audio input for a communication in progress, that the device is operating in a loud speaker mode. For example, the loud speaker mode may be a mode in which a loud speaker on the front side of the device is configured for audio output.

At block 406, the method includes determining that the front side of the device is in proximity to a surface. For example, in some embodiments, this determination may be made based on receiving a proximity indication or interrupt signal from a proximity sensing circuit of the device.

At block 408, the method includes determining, dependent on the determination that the device is in the loud speaker mode and the determination that the front side of the device is in proximity to the surface, that the device is in a position that is, at least in some cases, associated with acoustic coupling between the loud speaker and the front microphone.

At block 410, the method includes initiating, dependent on the determination that the device is in the position associated with acoustic coupling, emission of a beacon signal on the front side of the device. For example, in some embodiments, a beacon signal may be generated by a beacon generation circuit and may be output from the loud speaker on the front side of the device.

At block 412, the method includes receiving an indication of the strength of the beacon signal as measured on the front side of the device. For example, the indication may be a control or data signal received from a beacon measurement circuit of the device indicating the measured strength of the beacon signal or indicating whether or not the measured strength corresponds to an amount of acoustic coupling between the loud speaker and the front microphone that exceeds a predetermined threshold for acoustic coupling. In other embodiments, the method may include receiving an indication of the reverberation time of the beacon signal as measured on the front side of the device.

At block 414, the method includes determining, dependent on the indication of the strength of the received beacon signal, that the acoustic coupling between the loud speaker and the front microphone exceeds the predetermined threshold for acoustic coupling. In response to the determination that the acoustic coupling between the loud speaker and the front microphone exceeds the predetermined threshold, the method includes configuring a rear microphone of the device as the primary microphone for capturing audio input for the communication in progress, as in 416. In some embodiments, the method may also include configuring the front microphone as the secondary microphone for the communication in progress (not shown in FIG. 4).

Figure 5:
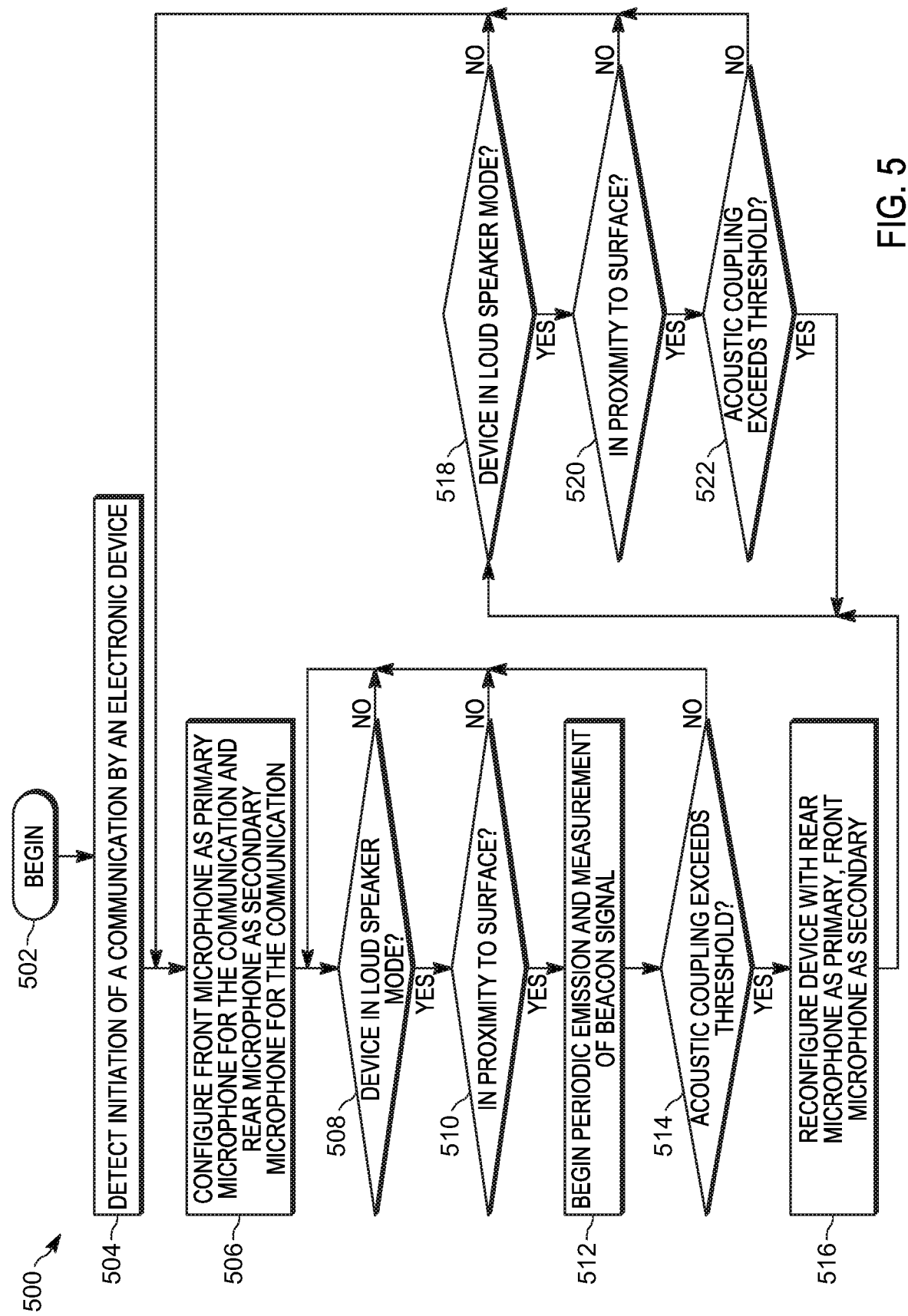
FIG. 5 is a flowchart illustrating selected elements of an example method for detecting high acoustic coupling at an electronic communication device and configuring the device in response, in accordance with some embodiments.

Referring now to FIG. 5, there is provided a flowchart illustrating selected elements of an example method 500 for detecting high acoustic coupling at an electronic communication device and configuring the device in response, in accordance with some embodiments. While a particular order of operations is indicated in FIG. 5 for illustrative purposes, the timing and ordering of such operations may vary where appropriate without negating the purpose and advantages of the examples set forth in detail throughout the remainder of this disclosure.

In this example embodiment, method 500 begins with block 502 in FIG. 5 and continues with block 504, where the initiation of a communication by an electronic communication device is detected.

At block 506, in response to detecting the initiation of a communication, the method includes configuring a front microphone of the device as the primary microphone for the communication and configuring a rear microphone of the device as the secondary microphone for the communication. In some embodiments, the configuration of the front microphone as the primary microphone and the rear microphone as the secondary microphone may be a default configuration for newly detected communications prior to performing the remaining operations shown in FIG. 5.

If, at block 508, it is determined that the device is operating in a loud speaker mode, method 500 continues at block 510. Otherwise, method 500 returns to block 508 until and unless it is determined that the device is operating in the loud speaker mode.

If, at block 510, it is determined that a front side of the device is in proximity to a surface, method 500 continues to block 512. Otherwise, method 500 returns to block 508 where one or more of the operations shown as 508 and 510 are repeated until and unless it is determined that the device is operating in the loud speaker mode and that the front side of the device is in proximity to a surface. If and when the device is operating in the loud speaker mode and the front side of the device is in proximity to a surface, the device may be in a position that is, at least in some cases, associated with acoustic coupling between the loud speaker and the front microphone. For example, the device may be in a rear-facing position in a holster or cradle, may be held up against a human body, or may be face down on surface while in the loud speaker mode, any of which may be associated with acoustic coupling between the loud speaker and the front microphone. However, if the device is not in a position associated with acoustic coupling between the loud speaker and the front microphone, such as if the device is in a front-facing position in a holster or cradle or is face up on a surface, the method may not continue to block 512.

At block 512, the method includes beginning the periodic emission and measurement of short beacon signals, as described herein.

If, at block 514, it is determined that the strength of the measured beacon signal indicates that acoustic coupling between the loud speaker and the front microphone exceeds a predetermined threshold, the device is experiencing high acoustic coupling, and method 500 continues at block 516. Otherwise, method 500 returns to block 508 where one or more of the operations shown as blocks 508 to 514 are repeated until and unless it is determined that the device is operating in the loud speaker mode, that the front side of the device is in proximity to a surface, and that acoustic coupling between the loud speaker and the front microphone exceeds the predetermined threshold. In other embodiments, it may be determined that the reverberation time of the measured beacon signal indicates that acoustic coupling between the loud speaker and the front microphone exceeds a predetermined threshold and that the device is experiencing high acoustic coupling.

At block 516, in response to determining that the device is experiencing above-threshold acoustic coupling, the method includes reconfiguring the device such that the rear microphone serves as the primary microphone and the front microphone serves as the secondary microphone for the communication in progress.

If, at block 518, it is determined that the device is still operating in the loud speaker mode, method 500 continues to block 520. Otherwise, method 500 returns to block 506, where the front microphone is reconfigured as the primary microphone and the rear microphone is reconfigured as the secondary microphone for the communication in progress.

If, at block 520, it is determined that the front side of the device is still in proximity to the surface, method 500 continues to block 522. Otherwise, method 500 returns to block 506, where the front microphone is reconfigured as the primary microphone and the rear microphone is reconfigured as the secondary microphone for the communication in progress.

If, at block 522, it is determined that the acoustic coupling between the loud speaker and the front microphone still exceeds the predetermined threshold, method 500 returns to block 518. Otherwise, method 500 returns to block 506, where the front microphone is reconfigured as the primary microphone and the rear microphone is reconfigured as the secondary microphone for the communication in progress.

In this example, while the device remains in a position associated with acoustic coupling and is experiencing high acoustic coupling, there may be no change to configuration of the primary and secondary microphones. However, if and when the device is no longer in position associated with acoustic coupling or is no longer experiencing high acoustic coupling, the method may include changing the configuration of the primary and secondary microphones.

In at least some embodiments, any or all of the operations shown in FIG. 5 may be repeated during the course of a particular communication, such as during a call, to dynamically reconfigure the primary and secondary microphones in response to changing conditions. In some embodiments, once the call is completed, the configurations of the front and rear microphones may revert to their initial or default functionality. In other embodiments, one or both of the microphones may be disabled once the call is completed and may remain disabled until another the initiation of another call is detected.

Figure 6:
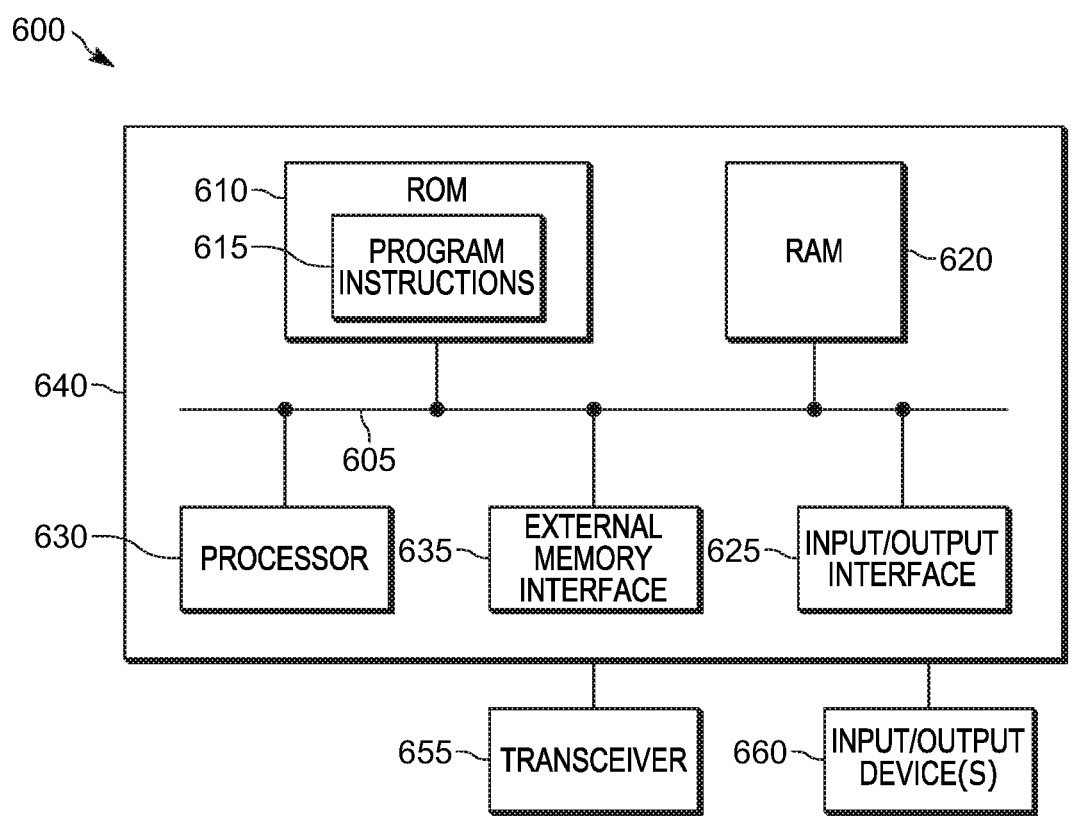
FIG. 6 is a block diagram illustrating selected elements of an example electronic device including an application processing unit, in accordance with some embodiments.

Referring now to FIG. 6, there is provided a block diagram illustrating selected elements of an example electronic device 600 including an application processing unit 640, in accordance with some embodiments. In various embodiments, electronic device 600 may a portable, battery-powered electronic device. In some embodiments, electronic device 600 may be an electronic communication device such as a multifunction radio, a mobile telephone, a laptop computer, a tablet computer, a smart phone, or another type of electronic communication device.

As illustrated in this example embodiment, application processing unit 640 may include a Read Only Memory (ROM) 610, a Random Access Memory (RAM) 620, an electronic processor 630, an input/output interface 625, and an external memory interface 635, all of which are coupled to a system bus 605 through which they communicate with each other. In various embodiments, electronic processor 630 may include a microprocessor, a microcontroller, a system-on-chip, a field-programmable gate array, a programmable mixed-signal array, or, in general, any system or sub-system that includes nominal memory and that is capable of executing a sequence of instructions in order to control hardware elements of electronic device 600.

In this example embodiment, ROM 610 stores program instructions 615, at least some of which may be executed by electronic processor 630 to perform the methods described herein. For example, at least some of the operations of method 400 illustrated in FIG. 4 or the operations of method 500 illustrated in FIG. 5 may be performed by program instructions executing on application processing unit 640. In some embodiments, program instructions 615 may include program instructions that when executed on application processing unit 640 implement other functionality features of electronic device 600. In some embodiments, program instructions 615 may be stored in another type of non-volatile memory, such as a hard disk, a CD-ROM, an optical storage device, a magnetic storage device, a PROM (Programmable Read Only Memory), an EPROM (Erasable Programmable Read Only Memory), an EEPROM (Electrically Erasable Programmable Read Only Memory) or a Flash memory. RAM 620 may, from time to time, store data representing inputs to the methods illustrated in FIG. 4 and FIG. 5, such as data received from one or more of input/output devise 660 through input/output interface 625. RAM 620 may also store data used in performing other functions of the electronic device 600.

In this example embodiment, input/output interface 625 may include one or more analog input interfaces, such as one or more A/D convertors, or digital interfaces for receiving signals or data usable in performing the methods described herein. For example, input/output interface 625 may include interfaces through which application processing unit 640 may be coupled to other elements of electronic device 600. In the illustrated example, application processing unit 640 is shown coupled to a transceiver 655 and one or more input/output devices 660. Transceiver 655 may, at various times, receive audio communications for playback over a loud speaker, such as loud speaker 120, or transmit audio captured at one or more microphones, such as microphones 110 or 115. In various embodiments, transceiver 655 may be or include a land mobile radio (LMR) transceiver, a long term evolution (LTE) transceiver, a WiFi transceiver, or another type of audio transceiver. In some embodiments, application processing unit 640 may be coupled to input/output devices 660 that implement one or more of a front microphone, a rear microphone, a proximity sensing circuit a loud speaker, a beacon generation circuit or a beacon measurement circuit, such as those illustrated in FIG. 2 and described above. Any or all of these input/output devices 660 may be configured to send data to or receive data from application processing unit 640 over one or more data lines through input/output interface 625, in various embodiments. Similarly, any or all of these input/output devices 660 may be configured to assert or receive a control signal from application processing unit 640 over one or more connections through input/output interface 625. In response to receiving various inputs from input/output devices 660, the processor 630 may execute program instructions to determine how, when, and whether to configure multiple microphones of device 600 based on device position and acoustic coupling.

In some embodiments, application processing unit 640 may be coupled to input/output devices 660 that implement other functionality features of electronic device 600, such as a keyboard, a mouse, a touch panel, a switch, an additional microphone, a video camera, a display, an additional speaker, an infrared sensor, one or more other sensors, and the like over input/output interface 625. External memory interface 635 may include one or more interfaces through which application processing unit 640 may be coupled to an external memory (not shown in FIG. 6). Such an external memory may include, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

In at least some embodiments, the methods and apparatus described herein for configuring multiple microphones of an electronic communication device based on device position and acoustic coupling may provide technical benefits when compared to existing techniques for microphone selection to reduce acoustic coupling. The described techniques use dynamic, on-the-fly audio routing, without an explicit user selection, based on device position, to improve improve audio quality. The described techniques include a two-step approach to determining the position and acoustic state of an electronic communication device using both proximity sensing and ultrasound sensing. This approach provides a more robust solution than approaches based solely on a proximity sensor. For example, in systems that use only a proximity sensor to detect in-holster or face-down positions, false positives may be detected when, for example, a user holds an electronic communication device in close proximity to their face or very close to their mouth, such as when using the device in a noisy environment. Similarly, false positives may be detected when a user places their hands on a touch screen display of an electronic device during a call. By adding ultrasonic coupling based detection, such false positives may be reduced or eliminated.

In a first step, the devices described herein use a proximity sensing circuit to determine, in conjunction with a determination that the device is operating in a loud speaker mode, that an electronic communication device is in a position associated with acoustic coupling between the loud speaker and the front microphone. The proximity sensing circuit may consume very little power. Only when these two conditions are met is a higher-power ultrasonic beacon generated and used to determine whether or not a high acoustic coupling condition is actually present. This approach to detecting a high acoustic coupling state yields better results than an approach that relies solely on a proximity sensing circuit but uses less power than would an approach that relies solely on an ultrasonic beacon. In addition, unlike some existing approaches, the techniques described herein do not require modifications to a holster for the electronic communication devices nor a corresponding addition of means for the device to detect that it is in an in-holster mode. Instead, the techniques described herein use existing radio capabilities without any hardware changes to the holster.

While several example embodiments are described in which the beacon signal is an ultrasonic beacon signal, other types of beacon signals may be generated and their received strengths, reverberation times, or other parameters indicative of acoustic coupling may be measured in order to determine if an electronic communication device is in a position in which high acoustic coupling is likely to be an issue requiring the re-routing of the audio within the device, such as by reconfiguring a rear-facing microphone as the primary microphone for a communication in progress. For example, in some embodiments, a light-based beacon and beacon measurement circuit may be employed. However, a light-based beacon system may be more intrusive than an ultrasound based system and may provide a less desirable user experience.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separately claimed subject matter.

We claim:

1. An electronic communication device, comprising:
a front microphone disposed on a front side of the device;
a rear microphone disposed on a rear side of the device opposite and substantially parallel to the front side of the device;
a loud speaker disposed on the front side of the device;
a proximity sensing circuit configured to determine that the front side of the device is in proximity to a surface;
a beacon generation circuit configured to generate a beacon signal output from the front side of the device;
a beacon measurement circuit disposed on the front side of the device and configured to:
receive the beacon signal; and
generate an indication of a strength of the received beacon signal;
a processing unit including circuitry to:
determine, while the front microphone is configured as a primary microphone for capturing audio input for a communication in progress, that the device is operating in a loud speaker mode in which the loud speaker is configured for audio output;
determine, dependent on the determination that the device is operating in the loud speaker mode and the determination that the front side of the device is in proximity to the surface, that the device is in a position associated with acoustic coupling between the loud speaker and the front microphone;
initiate, dependent on the determination that the device is in a position associated with acoustic coupling between the loud speaker and the front microphone, emission of the beacon signal by the beacon generation circuit;
determine, dependent on the indication of the strength of the received beacon signal, that the acoustic coupling exceeds a predetermined threshold for acoustic coupling; and
configure the rear microphone as the primary microphone for capturing audio input for the communication in progress in response to the determination that the acoustic coupling exceeds the predetermined threshold.

2. The electronic communication device of claim 1, wherein the beacon signal is an ultrasonic signal.

3. The electronic communication device of claim 1, wherein the beacon signal is output through the loud speaker.

4. The electronic communication device of claim 1, wherein to determine that the front side of the device is in proximity to the surface, the proximity sensing circuit is configured to detect that a sensor element of the proximity sending circuit is covered.

5. The electronic communication device of claim 1, wherein the proximity sensing circuit comprises a camera.

6. The electronic communication device of claim 1, wherein to determine that the front side of the device is in proximity to the surface, the proximity sensing circuit is configured to determine that a distance between the device and the surface is less than a predetermined threshold distance.

7. The electronic communication device of claim 1, wherein:
the proximity sensing circuit is further configured to output an interrupt signal to indicate that the front side of the device is in proximity to the surface; and
the processing unit further includes circuitry to:
receive the interrupt signal from the proximity sensing circuit; and
initiate the emission of the beacon signal by the beacon generation circuit in response to receipt of the interrupt signal.

8. The electronic communication device of claim 1, wherein to determine that the front side of the device is in proximity to the surface, the proximity sensing circuit is configured to detect that the device is disposed in a rear-facing position in a holster for the device.

9. The electronic communication device of claim 1, wherein to determine that the front side of the device is in proximity to the surface, the proximity sensing circuit is configured to detect that the device is placed on the surface in a position in which the front side of the device is face-down on the surface.

10. The electronic communication device of claim 1, wherein the processing unit further includes circuitry to:
determine that the device is not in a position associated with acoustic coupling between the loud speaker and the front microphone; and
configure the front microphone as the primary microphone for capturing audio input for the communication in progress in response to the determination that the device is not in a position associated with acoustic coupling between the loud speaker and the front microphone.

11. The electronic communication device of claim 1, wherein the processing unit further includes circuitry to:
determine, dependent on the indication of the strength of the received beacon signal, that the acoustic coupling does not exceed the predetermined threshold; and
configure the front microphone as the primary microphone for capturing audio input for the communication in progress in response to the determination that the acoustic coupling does not exceed the predetermined threshold.

12. A method for configuring an electronic communication device, comprising:
determining, while a front microphone of the device is configured as a primary microphone for capturing audio input for a communication in progress, that the device is operating in a loud speaker mode in which a loud speaker of the device is configured for audio output;
determining that a front side of the device is in proximity to a surface;
determining, dependent on the determination that the device is operating in the loud speaker mode and the determination that the front side of the device is in proximity to the surface, that the device is in a position associated with acoustic coupling between the loud speaker and the front microphone;
initiating, dependent on the determination that the device is in a position associated with acoustic coupling between the loud speaker and the front microphone, emission of a beacon signal by a loud speaker of the device;

determining, dependent on an indication of a measured property of the beacon signal as received by the front microphone, that the acoustic coupling between the loud speaker and the front microphone exceeds a predetermined threshold for acoustic coupling; and
configuring a rear microphone of the device as the primary microphone for capturing audio input for the communication in progress in response to the determination that the acoustic coupling between the loud speaker and the front microphone exceeds the predetermined threshold.

13. The method of claim 12, wherein the beacon signal is an ultrasonic signal.

14. The method of claim 12, wherein determining that the front side of the device is in proximity to the surface comprises detecting that a sensor element of a proximity sending circuit of the device is covered or determining that a distance between the device and the surface is less than a predetermined threshold distance.

15. The method of claim 12, further comprising:
determining, subsequent to configuring the rear microphone of the device as the primary microphone for capturing audio input for the communication in progress, that the device is no longer in a position associated with acoustic coupling between the loud speaker and the front microphone; and
configuring the front microphone as the primary microphone for capturing audio input for the communication in progress in response to the determination that the device is no longer in a position associated with acoustic coupling between the loud speaker and the front microphone.

16. The method of claim 12, further comprising:
determining, subsequent to configuring the rear microphone of the device as the primary microphone for capturing audio input for the communication in progress, that the acoustic coupling between the loud speaker and the front microphone no longer exceeds the predetermined threshold; and
configuring the front microphone as the primary microphone for capturing audio input for the communication in progress in response to the determination that the acoustic coupling between the loud speaker and the front microphone no longer exceeds the predetermined threshold.

17. A non-transitory, computer-readable storage medium having program instructions stored thereon that when executed by an electronic processor cause the electronic processor to perform:
determining, while a front microphone of an electronic communication device is configured as a primary microphone for capturing audio input for a communication in progress, that the device is operating in a loud speaker mode in which a loud speaker of the device is configured for audio output;
determining that a front side of the device is in proximity to a surface;
determining, dependent on the determination that the device is operating in the loud speaker mode and the determination that the front side of the device is in proximity to the surface, that the device is in a position associated with acoustic coupling between the loud speaker and the front microphone;
initiating, dependent on the determination that the device is in a position associated with acoustic coupling between the loud speaker and the front microphone, emission of a beacon signal by a loud speaker of the device;

determining, dependent on an indication of a strength of the beacon signal as received by the front microphone, that the acoustic coupling between the loud speaker and the front microphone exceeds a predetermined threshold for acoustic coupling; and configuring a rear microphone of the device as the primary microphone for capturing audio input for the communication in progress in response to the determination that the acoustic coupling between the loud speaker and the front microphone exceeds the predetermined threshold.

18. The non-transitory, computer-readable storage medium of claim 17, wherein determining that the front side of the device is in proximity to the surface comprises detecting that a sensor element of a proximity sending circuit of the device is covered or determining that a distance between the device and the surface is less than a predetermined threshold distance.

19. The non-transitory, computer-readable storage medium of claim 17, wherein, when executed by the electronic processor, the program instructions further cause the electronic processor to perform:

determining, subsequent to configuring the rear microphone of the device as the primary microphone for capturing audio input for the communication in progress, that the device is no longer in a position associated with acoustic coupling between the loud speaker and the front microphone; and configuring the front microphone as the primary microphone for capturing audio input for the communication in progress in response to the determination that the device is no longer in a position associated with acoustic coupling between the loud speaker and the front microphone.

20. The non-transitory, computer-readable storage medium of claim 17, wherein, when executed by the electronic processor, the program instructions further cause the electronic processor to perform:

determining, subsequent to configuring the rear microphone of the device as the primary microphone for capturing audio input for the communication in progress, that the acoustic coupling between the loud speaker and the front microphone no longer exceeds the predetermined threshold; and configuring the front microphone as the primary microphone for capturing audio input for the communication in progress in response to the determination that the acoustic coupling between the loud speaker and the front microphone no longer exceeds the predetermined threshold.

\* \* \* \* \*